(12) United States Patent
Lam

(10) Patent No.: US 9,728,011 B2
(45) Date of Patent: Aug. 8, 2017

(54) SYSTEM AND METHOD FOR IMPLEMENTING AUGMENTED REALITY VIA THREE-DIMENSIONAL PAINTING

(71) Applicant: SenMedia Limited, Hong Kong (HK)

(72) Inventor: Hiu Fung Lam, Hong Kong (HK)

(73) Assignee: SenMedia Limited, Hong Kong (HK)

( * ) Notice: Subject to any disclaimer, the term of this patent is extended or adjusted under 35 U.S.C. 154(b) by 55 days.

(21) Appl. No.: 14/742,699

(22) Filed: Jun. 17, 2015

(65) Prior Publication Data
US 2016/0012644 A1    Jan. 14, 2016

(30) Foreign Application Priority Data
Jul. 9, 2014    (HK) .................................. 14107000

(51) Int. Cl.
*G06T 19/00*    (2011.01)
*G09G 5/377*    (2006.01)
*G06T 7/73*    (2017.01)

(52) U.S. Cl.
CPC .............. *G06T 19/006* (2013.01); *G06T 7/74* (2017.01); *G06T 2207/30204* (2013.01); *G06T 2207/30208* (2013.01)

(58) Field of Classification Search
CPC ......... G06T 19/006; G06T 2207/30204; G06T 7/0044; G06T 2207/30208

USPC .................................................. 345/419, 633
See application file for complete search history.

(56) References Cited

U.S. PATENT DOCUMENTS

| | | | |
|---|---|---|---|
| 2012/0176516 A1* | 7/2012 | Elmekies ................ | G06F 3/011 348/239 |
| 2014/0028713 A1* | 1/2014 | Keating ................ | G06T 19/006 345/633 |
| 2014/0210856 A1* | 7/2014 | Finn ...................... | G01C 15/002 345/633 |
| 2015/0248785 A1* | 9/2015 | Holmquist ............ | G06T 19/006 345/419 |
| 2016/0012136 A1* | 1/2016 | Ben Zvi ............ | G06F 17/30041 707/770 |

\* cited by examiner

*Primary Examiner* — Jin-Cheng Wang

(57) ABSTRACT

Disclosed is an augmented reality system, including: an augmented reality apparatus including: an image acquisition unit configured to acquire an image of an augmented reality 3D marker attached to a real object; a marker analysis unit configured to analyze the image and obtain a 3D feature of the augmented reality 3D marker based on a predetermined image parameter of the image; and an augment process unit configured to perform a corresponding augmented reality process based on the 3D feature. An augmented reality method is also disclosed. The present patent application can achieve more interaction between the real world and a virtual environment.

18 Claims, 3 Drawing Sheets

SYSTEM AND METHOD FOR IMPLEMENTING AUGMENTED REALITY VIA THREE-DIMENSIONAL PAINTING

CROSS-REFERENCE TO RELATED APPLICATIONS

This application claims the benefit of Hong Kong Patent Application No. HK14107000.7 filed on Jul. 9, 2014; the contents of which is hereby incorporated by reference.

TECHNICAL FIELD

The present patent application relates to an augmented reality system and method.

BACKGROUND

Augmented reality (referred to as AR) technology is a new interactive technology developed on the basis of virtual reality technology. Referring to FIG. 1, AR applies virtual reality information to the real world by means of visualization technology, which superimposes virtual reality information that cannot be obtained in the real world on the screen for the real world directly, and thus allows users to interact with augmented reality application, and expands the user's perception of the real world. AR has been used in various applications, such as entertainment, video games, sports and mobile applications.

There are several ways to accomplish AR as follows:
1) determining the geographic location, orientation and tilt angle of a user terminal through the Global Positioning System (GPS), a geomagnetic sensor and an acceleration sensor, followed by obtaining relevant information upon determined geographic location, and displaying the same with overlay.
2) pre-saving information of marker images, followed by seeking and identifying the marker image in the current image by image recognition technology, and then superimposing relevant information on the marker image.
3) analyzing photographic images to identify scenes, objects and space, followed by superimposing relevant information.

Among the mentioned ways, the way of achieving the overlay of information by identifying marker is used widely and increasingly. Such way is able to add a virtual 3D object by identifying marker in real image with a camera, resulting in visual effects in combination with artificiality and reality.

However, there is a desire to further strengthen the interaction between a virtual entity and a real entity.

SUMMARY

The present patent application is directed to an augmented reality system. The system may include an augmented reality apparatus including an image acquisition unit configured to acquire an image of an augmented reality 3D marker attached to a real object; a marker analysis unit configured to analyze the image and obtain a 3D feature of the augmented reality 3D marker based on a predetermined image parameter of the image; and an augment process unit configured to perform a corresponding augmented reality process based on the 3D feature.

The augmented reality 3D marker may include a 3D painting.

The predetermined image parameter may include at least one of a color, a luminance, a shape and a feature pattern of the image.

The 3D feature may include at least one of a location and a direction of the augmented reality 3D marker.

The augmented reality process may include at least one of adding specific information to the real object and performing predetermined operation to a virtual 3D model associated with the real object. Association between the real object and the 3D virtual model may be determined based on at least one of a user's preset criteria, a random selection and the 3D feature.

The augmented reality apparatus may further include a motion capture engine configured to capture a motion track of a moving object. The augment process unit may control a 3D virtual model corresponding to the moving object to carry out a corresponding movement based on the motion track.

The 3D virtual model may be produced by using a 3D software and saved in a database, and the 3D software may include Maya or 3D Studio Max3D.

The augmented reality system may further include a system server including a database configured to store data of augmented reality; and a central processing device configured to perform various operations associated with the system. The augmented reality apparatus may access to the system server via wireless or wired mode; and the wireless mode includes at least one of WIFI network, 2G network, 3G network, 4G network, satellite communication, and radio communication.

In another aspect, the present application is directed to an augmented reality method, including: acquiring an image of an augmented reality 3D marker attached to a real object; analyzing the image and obtaining a 3D feature of the augmented reality 3D marker based on a predetermined image parameter of the image; and performing a corresponding augmented reality process based on the 3D feature.

The augmented reality 3D marker may include a 3D painting.

The predetermined image parameter includes at least one of a color, a luminance, a shape and a feature pattern of the image.

The 3D feature may include at least one of a location and a direction of the augmented reality 3D marker.

The augmented reality process may include at least one of adding specific information to the real object and performing predetermined operation to a virtual 3D model associated with the real object. Association between the real object and the 3D virtual model may be determined based on at least one of a user's preset criteria, a random selection and the 3D feature.

The augmented reality method may further include capturing a motion track of a moving object. The augmented reality method may further include controlling a 3D virtual model corresponding to the moving object to carry out a corresponding movement based on the motion track. The 3D virtual model may be produced by using a 3D software and saved in a database, and the 3D software may include Maya or 3D Studio Max3D.

BRIEF DESCRIPTION OF THE DRAWINGS

Hereinafter, the present patent application will be further illustrated in conjunction with the accompanying drawings and embodiments, in which.

DETAILED DESCRIPTION

Reference will now be made in detail to a preferred embodiment of the system and the method for communicating with serially connected devices disclosed in the present patent application, examples of which are also provided in the following description. Exemplary embodiments of the system and the method disclosed in the present patent application are described in detail, although it will be apparent to those skilled in the relevant art that some features that are not particularly important to an understanding of the system and the method may not be shown for the sake of clarity.

Furthermore, it should be understood that the system and the method disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
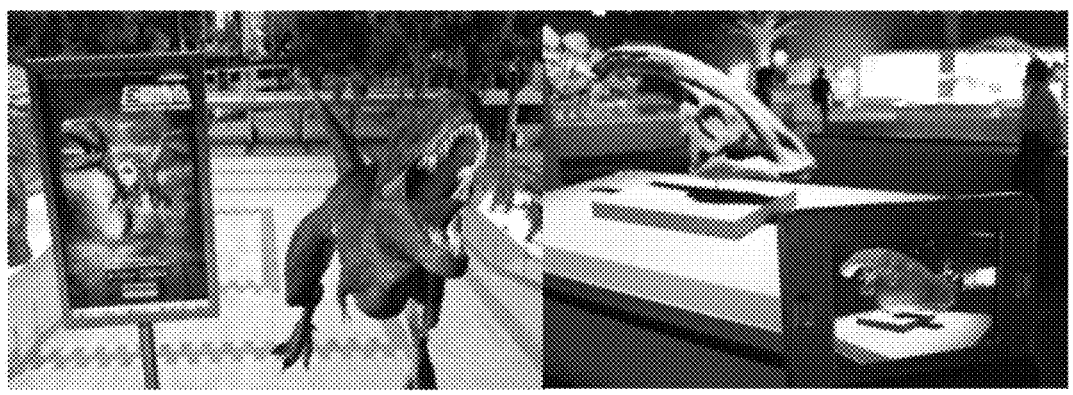
FIG. 1 is an exemplary picture of augmented reality.
Figure 2:
FIG. 2 is an exemplary picture of 3D marker.

The overlay of information may be achieved by identifying marker in augmented reality technology. A 3D marker is employed as an identification marker of augmented reality in an embodiment of the present patent application. An example of a 3D marker may be a 3D painting, as illustrated in FIG. 2.

Based on the characteristics of human eyes to observe the world, a 3D painting creates a virtual stereoscopic effect from a visual standpoint on a planar picture with optical principle of refraction and perspective, which allows a visitor to look and feel the three-dimensional relationship involved up and down, side to side and front to back of an object with an immersive sensation. The perspective principle of the 3D painting is mainly different from that of a normal painting. With regard to the normal painting, its composition is merely based on the perspective of the painting itself, without referring to a viewer's viewpoint from his/her position; while the composition of the 3D painting is based on a viewer's viewpoint from his/her position and takes the viewer's viewpoint as a visual origin, which makes the 3D painting not only a picture but also a real visual space through which the viewer may be integrated into the picture. A best visual effect may be obtained by viewing from the best viewpoint of its original design with a camera. Thus, the 3D painting may be employed as a marker of augmented reality, thereby making the marker of augmented reality attract more attention and become more intuitive in the real world. In addition, the marker based on 3D painting will be able to carry more information so as to create more interaction in the virtual world.

Figure 3:
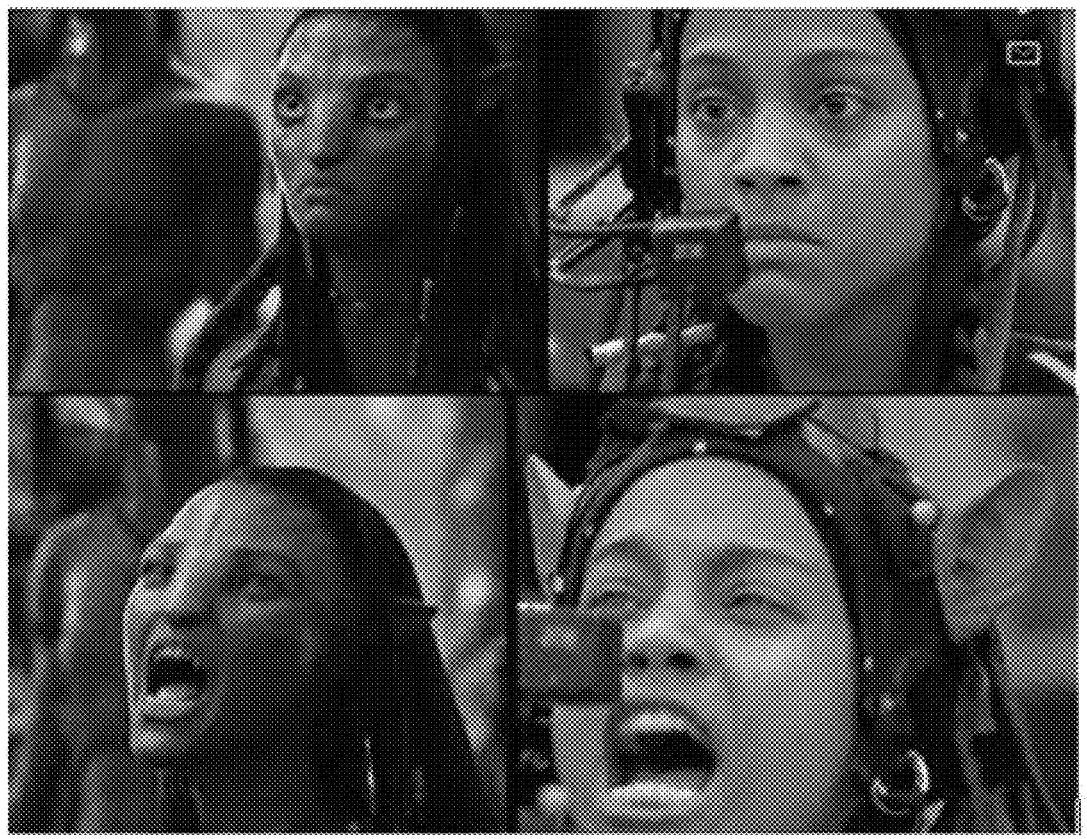
FIG. 3 is an exemplary picture of motion capture and control.

The present patent application also applies motion capture technology. The captured motion track of a moving object (e.g., human body) is reflected correspondingly in the virtual world, so that there is more interaction between the corresponding model in the virtual world and the real world. With a sensor system, such as a motion sensor, motion track data may be captured to determine one or more moving objects, for instance, a particular motion track of human body. An example of motion capture is illustrated by an exemplar picture of the American film Avatar shown in FIG. 3. Once a motion of a real actor/actress is captured, it will be displayed correspondingly on the movie model figure.

In the present patent application, means for implementing augmented reality is referred to as an augmented reality (AR) apparatus, which may be a part of a mobile terminal (e.g., a smart phone). The AR apparatus may be used to shoot markers associated with AR, such as the 3D painting drawn on a street as illustrated in FIG. 2. In an AR application, when detecting that a target with an AR marker exists in a real scene through a camera provided in a mobile terminal, the displayed target region is overlaid with the relevant virtual content based on the detected AR marker.

Since different information may be held by parameters such as angle, color, luminance and so on, the AR marker based on 3D painting may hold more information with such 3D feature of 3D painting, so as to create more interaction in AR.

For example, an interaction may be formed with a virtual game world by using the exemplar marker of the 3D painting shown in FIG. 2. After the game starts, when the exemplary marker of the 3D painting mentioned above is detected, a street view of the real world may be displayed, and, augmented reality may be achieved based on the exemplary marker of the 3D painting, for instance, the aforementioned 3D painting forms an entrance of other spaces presented on the street in the game world. In addition, if the exemplary marker of the 3D painting is detected from the right side, based on such information, an angel at the right side of the 3D painting will be presented at the entrance of other spaces as a companion of the protagonist of the game and goes on an adventure with the protagonist in the other spaces.

The protagonist of the game may be played by a 3D model produced by 3D software such as Maya, 3D Studio Max and so on. The 3D model may be an avatar in the virtual world of a realistic figure, such as the user of the augmented reality apparatus. As mentioned above, the augmented reality system according to the present patent application applies a motion capture engine to capture the motion track of the user, so as to make the avatar to move correspondingly in the virtual world.

Figure 4:
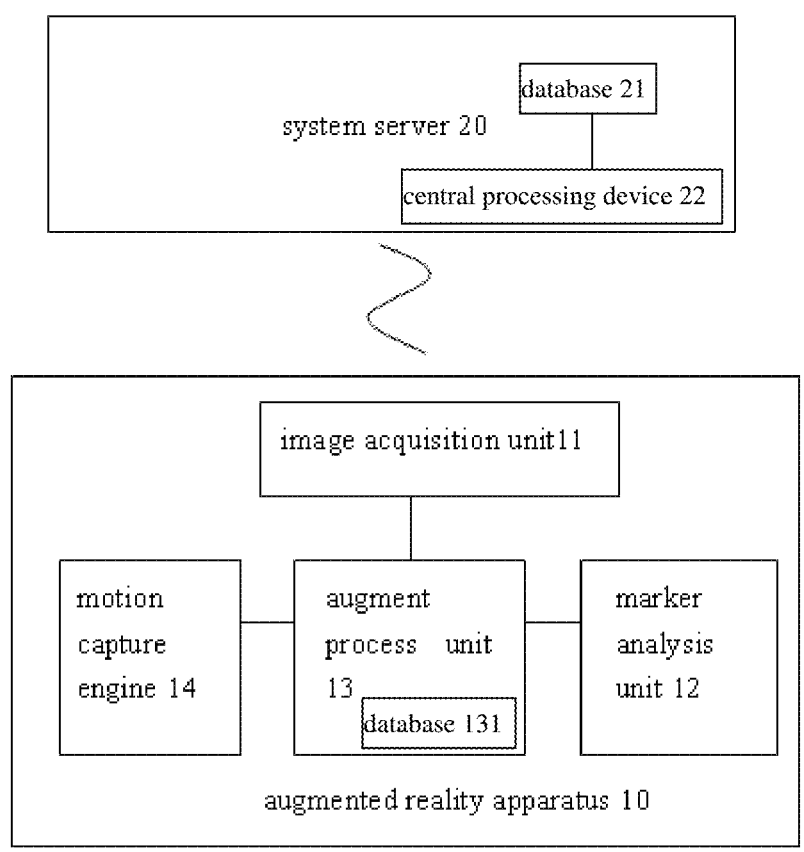
FIG. 4 is an exemplary configuration diagram of the augmented reality system according to an embodiment of the present patent application.

Referring to FIG. 4, the AR apparatus 10 according to the present patent application includes an image acquisition unit 11 for acquiring an image of a 3D augmented reality marker attached to a real object, a marker analysis unit 12 for analyzing the meaning of the 3D marker, an augment process unit 13 for processing augmented reality based on an analysis result, and a motion capture engine 14 for capturing the motion track of a moving object.

The image acquisition unit 11 is used for acquiring an image of an AR marker. As described above, the marker may be a 3D painting drawn on a street as shown in FIG. 2. In this case, the street is the real object.

The marker analysis unit 12 is used for analyzing the meaning of the 3D marker obtained by the image acquisition unit 11. According to an example, the marker analysis unit 12 determines how the AR displays or works. In other words, an AR application may determine the manner in which the virtual information overlays onto the real world based on the analysis result of the marker analysis unit 12. The marker analysis unit 12 may get different results based on the location, direction, feature pattern, shape, color and other factors displayed upon the 3D marker. Different analysis results will correspond to different information of augmented reality.

Different information from different positions and different directions such as the front, back, left, right, top and bottom may be provided in augmented reality due to the basis of 3D marker. For example, a 3D marker of augmented reality corresponds to a mark on a large gymnasium. When the 3D marker is acquired, based on its orientation, different information about the gymnasium may be displayed. As mentioned earlier, although the 3D painting itself is planar, it presents a stereoscopic effect to human vision. Assume that an AR user has found an AR marker illustrated by a 3D painting at the front door of the gymnasium, when observing the 3D painting from the right side of the front door, the user will visually feel that he/she is looking to the right side of the 3D object presented by the 3D painting. The marker analysis unit 12 may analyze the feature based on the marker image acquired by the image acquisition unit 11. Accordingly, the augment process unit 13 may add corresponding information associated with the feature to the real object, i.e., the gymnasium. Therefore, despite standing at the front of the gymnasium, in the AR world, the AR user may also view the scene at the right side door of the gymnasium as well as other additional information based on AR application. When the user moves from the right side to the left side at the front door, similarly, despite standing at the front of the gymnasium, in the AR world, the AR user may also view the scene at the left side door of the gymnasium as well as other additional information based on AR application.

In an embodiment of the present patent application, the AR process includes:

1) acquiring an image of a 3D AR marker attached to a real-world object, by the image acquisition unit 11;
2) analyzing the obtained 3D marker image, with the image parameters of the obtained 3D marker image such as color and luminance, analyzing and obtaining the 3D features of the obtained 3D marker including its location and direction, by the marker analysis unit 12;
3) performing a corresponding augmented reality process based on the analyzed 3D features, such as adding different descriptions, adding different equipments to a game-world object, etc., by the augment process unit 13;
4) capturing the motion track of a specific moving object and providing the motion track data to the augment process unit 13, by with the motion capture engine 14; and
5) controlling the specific virtual object to carry out corresponding movements upon the motion track data, by the augment process unit 13.

The augment process unit 13 may be provided with a database 131 for storing 3D virtual character models, which may be static or dynamic. Different virtual character models may be selected based on a user's preset criteria, random selection or 3D feature of 3D marker. For example, referring to FIG. 2, when the marker of the 3D painting is detected at the left side, a human model is selected from the database 131; when the marker of the 3D painting is detected at the right side, an angel model is selected from the database 131. When no motion is captured, the 3D model, as the avatar of a real-world figure, may also be static. When capturing a movement of a real-world figure, such as dancing, the avatar in the virtual world corresponding to the real-world figure may also dance. As described above, the augmented reality apparatus 10 may be a user device, such as a personal computer (PC) or a smart device; a personal computer may include a desktop or laptop computer running with windows or OS X operating system; a smart device may include a smart phone, a tablet PC running with IOS system or Android system.

In addition, the augmented reality system may include a system server 20. The system server 20 may include a database 21 for storing data of augmented reality, and a central processing device 22 for performing various operations associated with the system. The system server 20 supports access via wireless or wired mode; the wireless or wired mode includes WIFI/2G/3G/4G mobile network access, satellite communication, or radio communication access.

Accordingly, there is no need for the augmented reality apparatus 10 to be provided with a large database 131. The augmented reality apparatus 10 may interact with the system server 20 to obtain necessary data. For example, with such a augmented reality system, a virtual game world is constructed, and then the augmented reality apparatus 10, as a user device of the player involved in the game, may obtain the avatar model in the game world corresponding to the player from the system server 20. Based on motion capture, the motion of the player in the real world may be reflected on the avatar in the game world. With augmented reality based on 3D marker, predetermined operations may be performed on the virtual 3D model associated with the real-world object. For example, due to the 3D feature of the 3D marker, the player may interact more with a 3D marker. As shown in FIG. 2, the player may reflect his/her station of supporting human or angel in the game by means of standing at the left side or the right side, and may be accompanied with a human companion or an angel companion, or obtain corresponding race equipment. This makes the augmented reality apparatus based on 3D marker according to the present patent application more interactive.

In connection with the above, the embodiments of the present patent application have been described in conjunction with accompanying drawings; however, the present patent application shall not be limited to these specific embodiments. The above embodiments are merely illustrative, but not restrictive. Various forms, without departing from the spirit of the present patent application and the claimed scope, may be made by those skilled in the art under the inspiration of the present patent application, which fall within the protection of the present patent application.

What is claimed is:

1. An augmented reality system, comprising:
   an augmented reality apparatus comprising:
   an image acquisition unit configured to acquire an image of an augmented reality 3D marker attached to a real object;
   a marker analysis unit configured to analyze the image and obtain a 3D feature of the augmented reality 3D marker based on a predetermined image parameter of the image; and
   an augment process unit configured to perform a corresponding augmented reality process based on the 3D feature;
   wherein the augmented reality 3D marker comprises a 3D painting which itself is planar, but presents a stereoscopic effect to human vision.

2. The augmented reality system according to claim 1, wherein the predetermined image parameter comprises at least one of a color, a luminance, a shape and a feature pattern of the image.

3. The augmented reality system according to claim 1, wherein the 3D feature comprises at least one of a location and a direction of the augmented reality 3D marker.

4. The augmented reality system according to claim 1, wherein the augmented reality process comprises: at least one of adding specific information to the real object and performing predetermined operation to a virtual 3D model associated with the real object.

5. The augmented reality system according to claim 4, wherein association between the real object and the 3D virtual model is determined based on at least one of a user's preset criteria, a random selection and the 3D feature.

6. The augmented reality system according to claim 1, the augmented reality apparatus further comprising: a motion capture engine configured to capture a motion track of a moving object.

7. The augmented reality system according to claim 6, wherein the augment process unit controls a 3D virtual model corresponding to the moving object to carry out a corresponding movement based on the motion track.

8. The augmented reality system according to claim 7, wherein the 3D virtual model is produced by using a 3D software and saved in a database, and the 3D software comprises Maya or 3D Studio Max3D.

9. The augmented reality system according to claim 1, further comprising:
a system server comprising:
a database configured to store data of augmented reality; and
a central processing device configured to perform various operations associated with the system.

10. The augmented reality system according to claim 9, wherein the augmented reality apparatus accesses to the system server via wireless or wired mode; and the wireless mode comprises at least one of WIFI network, 2G network, 3G network, 4G network, satellite communication, and radio communication.

11. An augmented reality method, comprising:
acquiring an image of an augmented reality 3D marker attached to a real object;
analyzing the image and obtaining a 3D feature of the augmented reality 3D marker based on a predetermined image parameter of the image; and
performing a corresponding augmented reality process based on the 3D feature;
wherein the augmented reality 3D marker comprises a 3D painting which itself is planar, but presents a stereoscopic effect to human vision.

12. The augmented reality method according to claim 11, wherein the predetermined image parameter comprises at least one of a color, a luminance, a shape and a feature pattern of the image.

13. The augmented reality method according to claim 11, wherein the 3D feature comprises at least one of a location and a direction of the augmented reality 3D marker.

14. The augmented reality method according to claim 11, wherein the augmented reality process comprises: at least one of adding specific information to the real object and performing predetermined operation to a virtual 3D model associated with the real object.

15. The augmented reality method according to claim 14, wherein association between the real object and the 3D virtual model is determined based on at least one of a user's preset criteria, a random selection and the 3D feature.

16. The augmented reality method according to claim 11, further comprising: capturing a motion track of a moving object.

17. The augmented reality method according to claim 16, further comprising: controlling a 3D virtual model corresponding to the moving object to carry out a corresponding movement based on the motion track.

18. The augmented reality method according to claim 17, wherein the 3D virtual model is produced by using a 3D software and saved in a database, and the 3D software comprises Maya or 3D Studio Max3D.

* * * * *